Apr. 24, 1923.

A. BUTTERWORTH ET AL 1,453,127

MULTISPEED GEAR FOR MACHINE TOOLS

Filed Nov. 13, 1919  2 Sheets-Sheet 1

Witnesses

Inventors
Arthur Butterworth
Arthur Butterworth, Jr.
Harold Butterworth

By Sturtevant & Mason,
Attorneys

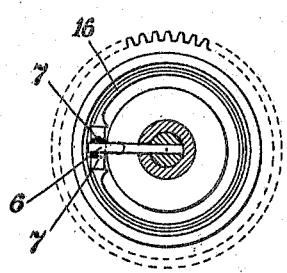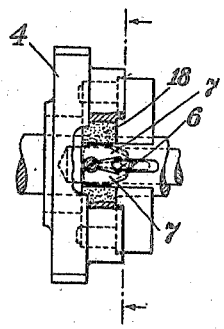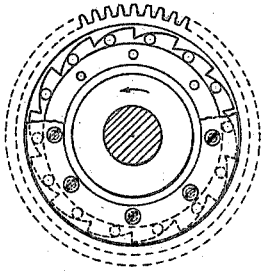

Patented Apr. 24, 1923.

1,453,127

UNITED STATES PATENT OFFICE.

ARTHUR BUTTERWORTH, ARTHUR BUTTERWORTH, JR., AND HAROLD BUTTERWORTH, OF ROCHDALE, ENGLAND.

MULTISPEED GEAR FOR MACHINE TOOLS.

Application filed November 13, 1919. Serial No. 337,843.

*To all whom it may concern:*

Be it known that we, ARTHUR BUTTERWORTH, ARTHUR BUTTERWORTH, Jr., and HAROLD BUTTERWORTH, subjects of the King of Great Britain, residing at Rochdale, in the county of Lancaster and Kingdom of England, have invented certain new and useful Improvements in Multispeed Gears for Machine Tools, of which the following is a specification.

The present invention relates to improvements in machine tools such as lathes, or the like machines, semi-automatic chucking machines and the like.

An object of the present invention is to provide a simple clutch operating mechanism for the multi-speed gear as applied to the various parts of such machines.

A further object of this invention is to save expense and avoid cumbersome parts adjacent the speed gear as hitherto.

The invention is more particularly described with reference to the accompanying drawings in which:—

Figs. 3 and 4 show details of the expanding clutch.

Fig. 5 shows details of the roller clutch.

Figure 1:
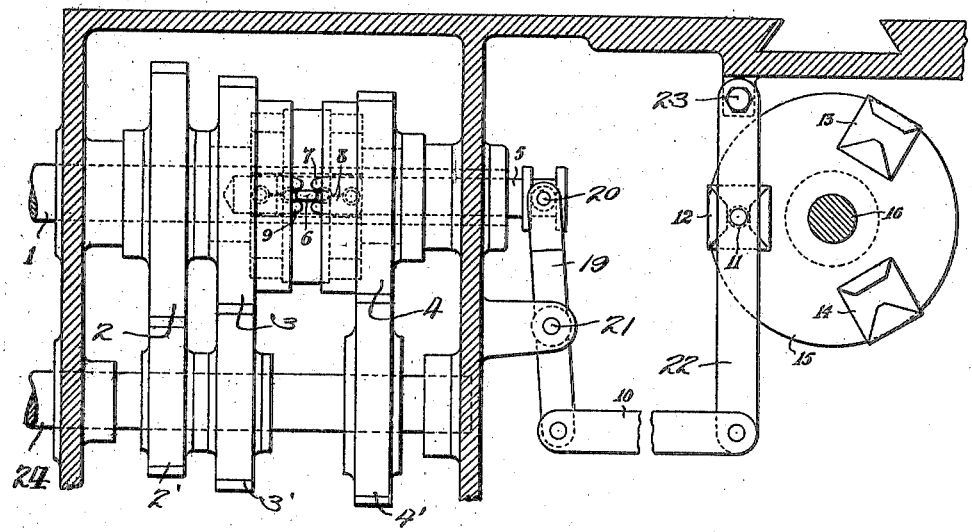
Figure 1 is a side elevation of a change speed gear as applied to a machine tool.

A drive from a driving shaft is transmitted to the working shaft 1 of the lathe by means of gear wheels permanently in mesh with the gear wheels 2, 3, 4, of which 3 and 4 are rotatable about the shaft 1 but can be coupled to said shaft by means of the axial displacement of an operating shaft 5. The gear wheel 2 is connected to the shaft 1 by a one way roller clutch of the type shown in Fig. 5.

Figure 2:
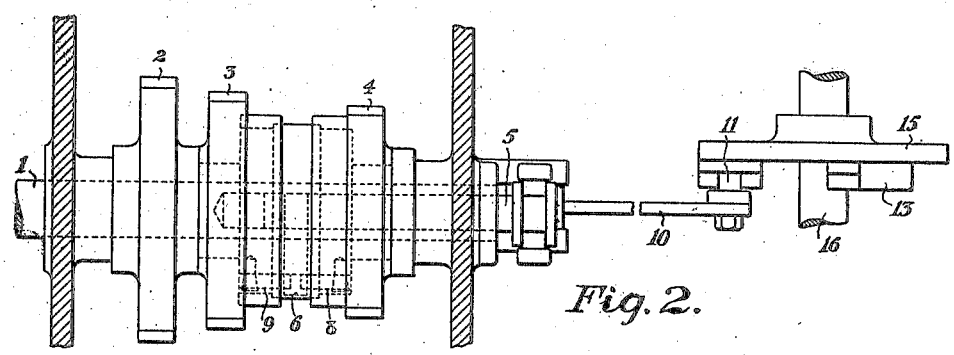
Figure 2 is a corresponding plan view.

The operating shaft moves within the hollow shaft 1, and carries pin 6 which operates in a longitudinal slot cut in the shaft 1. In the position shown in Figs. 1 and 2, the drive of the shaft is taken through the toothed wheel 2 which gives a certain speed of revolution to the headstock spindle and chuck. When however the operating shaft is displaced towards the right, the pin 6 forces apart the ends 7 of a pair of pivoted cam jaws 8 which expand a friction lining 18 and cause the toothed pinion 4 to be coupled to the driven shaft 1. Since the ratio of the gearing between the driving shaft and the driven shaft increases from pinion 2 to pinion 4, it follows that the speed of the wheel 4 and consequently of the shaft 1 is greater than the speed of the wheel 2. In consequence the roller clutch between the wheel 2 and the shaft 1 allows the wheel 4 to take up the drive of the driving shaft. Similarly when the operating shaft 5 is displaced towards the left, the pin 6 forces apart the jaws of the cam 9 and causes the toothed pinion 3 to be coupled to the shaft 1 to take up the drive of the driving shaft.

The displacement of shaft 5 is effected by means of a lever 19 attached at one end to a fixed pin 20 on the shaft 5 and pivoted about a fixed point 21. The other end of the lever 19 is connected by means of a link 10 to one end of a second lever 22 the other end of which pivots about a fixed point 23. The lever 22 has a pin 11 which lies in the path of a number of cam stops 12, 13, 14, mounted on a disc 15 which is rotated by a driving shaft 16. The cams are adjustable in a radial direction and the bearing surface of each cam is therefore at a predetermined distance from the centre of the shaft 16. Consequently on the rotation of the shaft 16, the lever 22 is caused to move into predetermined positions by the engagement of the cams with the pin 11. In this way the axial displacement of the shaft 5 and the consequent engagement of the gear wheels 2, 3, and 4 with the shaft 1 is effected as desired.

We declare that what we claim is:—

A device of the class described comprising a drive shaft, three spaced gears of varying diameter fixed thereon, a hollow driven shaft, three gears loosely mounted thereon and permanently meshing with said first three gears, the largest of said second three gears having an overrunning clutch connection with said driven shaft, clutch mechanism for selectively connecting either of said two remaining loosely mounted gears to said driven shaft, said mechanism including a split-ring expanding friction lining within each gear, a pair of cam jaws arranged to operate between the free ends of each lining, the jaws of each pair being pivoted together at their outer ends and having their free ends facing an operating rod passing through said hollow driven shaft and provided with a lateral lug adapted to be selectively shifted between either pair of jaws to clutch the corresponding gear to said driven shaft.

In witness whereof, we have hereunto signed our names this 15th day of September, 1919, in the presence of two subscribing witnesses.

ARTHUR BUTTERWORTH.
ARTHUR BUTTERWORTH, Jr.
HAROLD BUTTERWORTH.

Witnesses:
JOHN PRIOR,
ANNIE THOMAS.